United States Patent
Coyne et al.

[11] Patent Number: 6,064,882
[45] Date of Patent: May 16, 2000

[54] SYSTEM AND METHOD FOR SATELLITE CALL OPTIMIZATION

[75] Inventors: Michael Coyne, Stockholm, Sweden; Eric Valentine, Plano, Tex.; Theodore Havinis, Kerkdrade, Netherlands

[73] Assignee: Ericsson Inc., Research Triangle Park, N.C.

[21] Appl. No.: 08/996,480

[22] Filed: Dec. 23, 1997

[51] Int. Cl.⁷ .................................................. H04Q 7/20
[52] U.S. Cl. .................... 455/428; 455/12.1; 455/445
[58] Field of Search .................... 455/445, 12.1, 455/427, 428, 560, 432, 433, 435

[56] References Cited

U.S. PATENT DOCUMENTS

| | | | |
|---|---|---|---|
| 5,173,933 | 12/1992 | Jabs et al. | 379/58 |
| 5,448,623 | 9/1995 | Wiedman et al. | 455/12.1 |
| 5,509,004 | 4/1996 | Bishop, Jr. et al. | 455/12.1 |
| 5,852,779 | 12/1998 | Sawyer | 455/445 |
| 5,878,347 | 3/1999 | Joensuu et al. | 455/445 |
| 5,884,179 | 3/1999 | Patel | 455/445 |
| 5,915,222 | 6/1999 | Olsson et al. | 455/445 |

FOREIGN PATENT DOCUMENTS

| | | |
|---|---|---|
| 2 281 014 | 2/1995 | United Kingdom . |
| 2 295 296 | 5/1996 | United Kingdom . |
| WO 97/46036 | 12/1997 | WIPO . |

OTHER PUBLICATIONS

PCT International Search Report dated Apr. 21, 1999.

*Primary Examiner*—Dwayne D. Bost
*Assistant Examiner*—Quochien B. Vuong
*Attorney, Agent, or Firm*—Jenkens & Gilchrist, P.C.

[57] ABSTRACT

A telecommunications system and method is disclosed which allows for optimization of calls using satellite resources by moving a Mobile Station's (MSs) registration to an optimum Mobile Switching Center/Visitor Location Register (MSC/VLR) within the area visible to the satellite. This can be accomplished by sending the Called Party Number (CPN) to a Call Optimization Server (COS), which performs a pre-analysis on the CPN to determine the optimum MSC/VLR, e.g., the MSC/VLR with the closest connection to the called subscriber. Thereafter, the address of the optimum MSC/VLR is returned to the MS, which can then register with the indicated MSC/VLR and send a SETUP message to the new MSC/VLR to complete the call. This optimization can also be performed for mobile terminated calls, from either another Mobile Station or from a caller within the Public Switched Telephone Network (PSTN) (wireline network).

42 Claims, 6 Drawing Sheets

SYSTEM AND METHOD FOR SATELLITE CALL OPTIMIZATION

BACKGROUND OF THE PRESENT INVENTION

Field of the Invention

The present invention relates generally to telecommunications systems and methods for call management within a satellite network, and specifically to optimization of calls, using existing satellite resources, which reduces the amount of traffic handled by terrestrial networks.

Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system in use today, and described in more detail herein.

Figure 1:
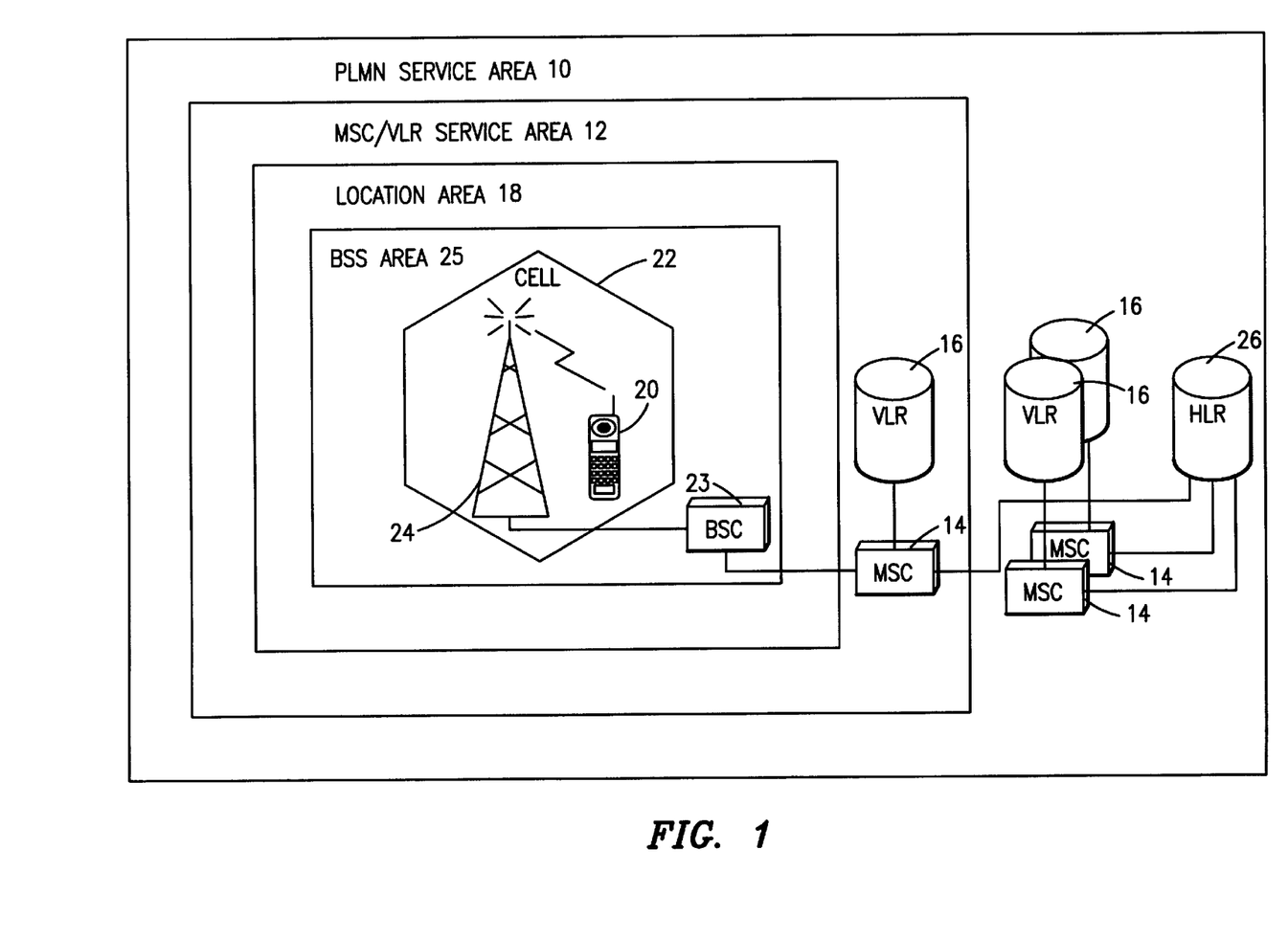
FIG. 1 is a block diagram of a conventional terrestrially-based wireless telecommunications system.

With reference now to FIG. 1 of the drawings, there is illustrated a GSM Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

It should be understood that the aforementioned system 10, illustrated in FIG. 1, is a terrestrially-based system. In addition to the terrestrially-based systems, there are a number of satellite systems, which work together with the terrestrially-based systems to provide cellular telecommunications to a wider network of subscribers. This is due to the fact that the high altitude of the satellite makes the satellite visible (from a radio perspective) from a wider area on the earth. The higher the satellite, the larger the area that the satellite can communicate with.

Figure 2:
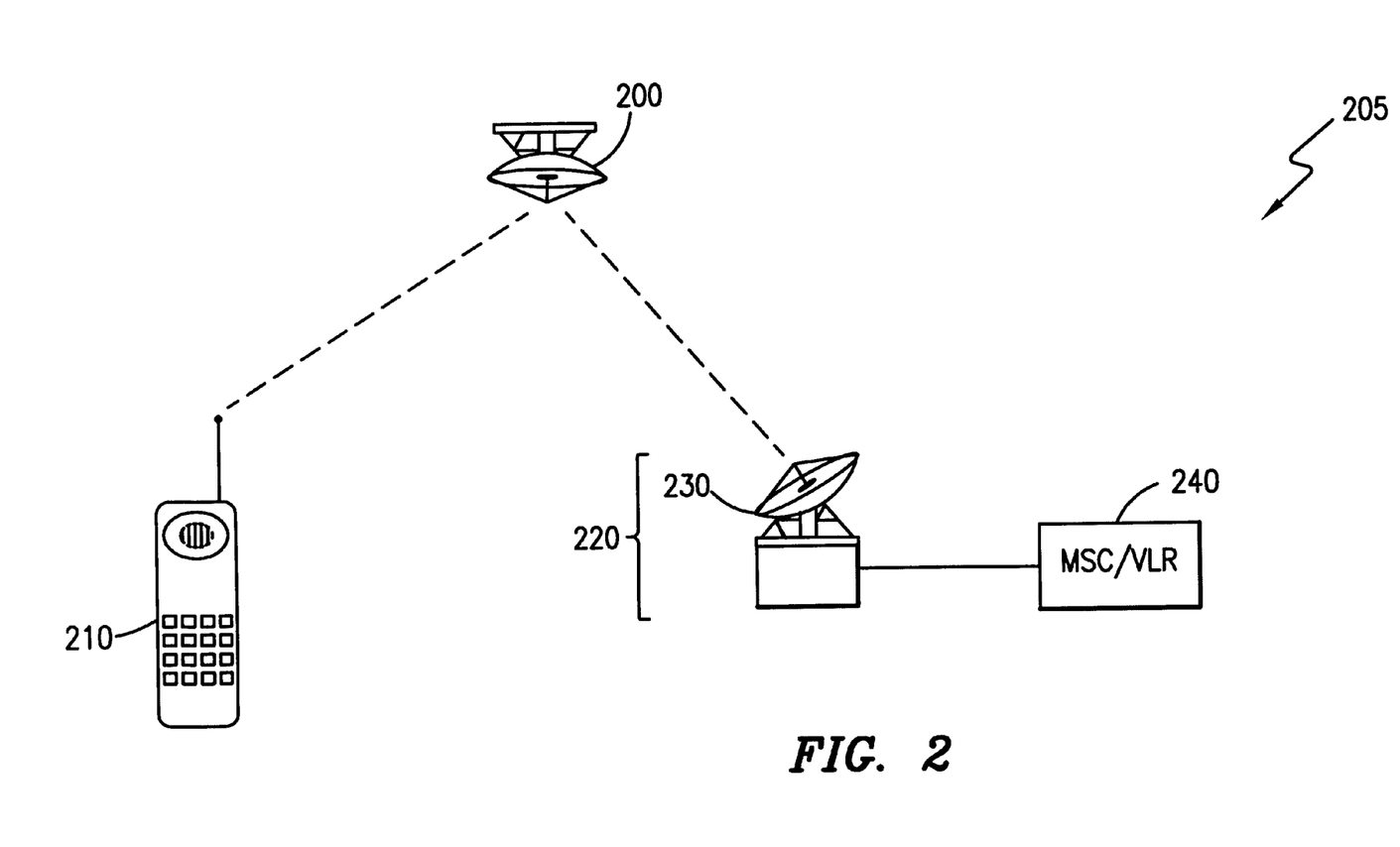
FIG. 2 is a block diagram illustrating aspects of a sample satellite-based network.

Within a satellite-based network 205, as shown in FIG. 2 of the drawings, a system of geostationary satellites 200 in orbit are used to provide communication between Mobile Stations (MS) 210 and a satellite-adapted Base Station System (SBSS) 220, which is connected to an integrated Mobile Switching Center/Visitor Location Register (MSC/VLR) 240. The MS 210 communicates via one of the satellites 200 using a radio air interface, for instance, based on the Time Division Multiple Access (TDMA) or Code Division Multiple Access (CDMA). The satellite 200 in turn communicates with one or more SBSSs 220, which consist of equipment for communicating with the satellites 200 and through the satellites 200 to the Mobile Stations 210. The antennae and satellite tracking part of the system is the Radio Frequency Terminal (RFT) subsystem 230, which also provides for the connection of the communication path to the satellite 200.

In such satellite networks 205 using geostationary satellites 200, the coverage area for a satellite 200 can be (and usually is) very large. This area can be served by a number of MSC/VLRs 240 which are connected to Public Switched Telephone Networks (PSTNs) (wireline networks), PLMNs (cellular networks) and each other. The terrestrial interconnections (trunk circuits) to these MSC/VLRs 240 are expensive to install and maintain, especially in comparison to handling the traffic over the satellite 200. Currently, the terrestrial trunk circuits are leased or owned by the operator, and in some cases, may need to be installed when the satellite network 205 is commissioned. Since the distances within the area served by the satellite(s) 200 are typically very large, the costs for these circuits can be enormous. In particular, the costs can be considerable if the circuits must cross remote areas or oceans.

It is therefore an object of the invention to optimize satellite networks, using existing satellite resources, while reducing the amount of traffic which must be handled on terrestrial networks.

SUMMARY OF THE INVENTION

The present invention is directed to telecommunications systems and methods which allow for optimization of calls using satellite resources by moving a mobile subscriber's registration to an optimum MSC/VLR. This can be accomplished by sending the Called Party Number (CPN) using, for example, an Unstructured Supplementary Services Data (USSD) string, to a Call Optimization Server (COS), which performs a pre-analysis on the CPN to determine the optimum MSC/VLR, e.g., the MSC/VLR with either the closest connection to the called subscriber or the MSC/VLR with the least expensive link to the called subscriber. Thereafter, the address of the optimum MSC/VLR is returned to the MS, which can then register with the indicated MSC/VLR. Once the registration is complete, the MS can send a SETUP message to the new MSC/VLR, and the call can be completed. In cases where the calling and called subscribers are mobile subscribers, the optimum MSC/VLR for the called mobile subscriber would typically be the same MSC/VLR as the calling mobile subscriber. By instructing the called MS to register with the same MSC/VLR as the calling MS, the call can be completed without utilizing any trunklines. In addition, satellite resources can be conserved by performing the connection for these calls within the satellite, e.g., only one bi-directional path is required (MS-satellite-MS) instead of two (MS-satellite-SBSS-satellite-MS). Advantageously, this optimization prccess can also be used for calls placed to and from the Public Switched Telephone Network (PSTN).

BRIEF DESCRIPTION OF THE DRAWINGS

The disclosed inventions will be discussed with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 3:
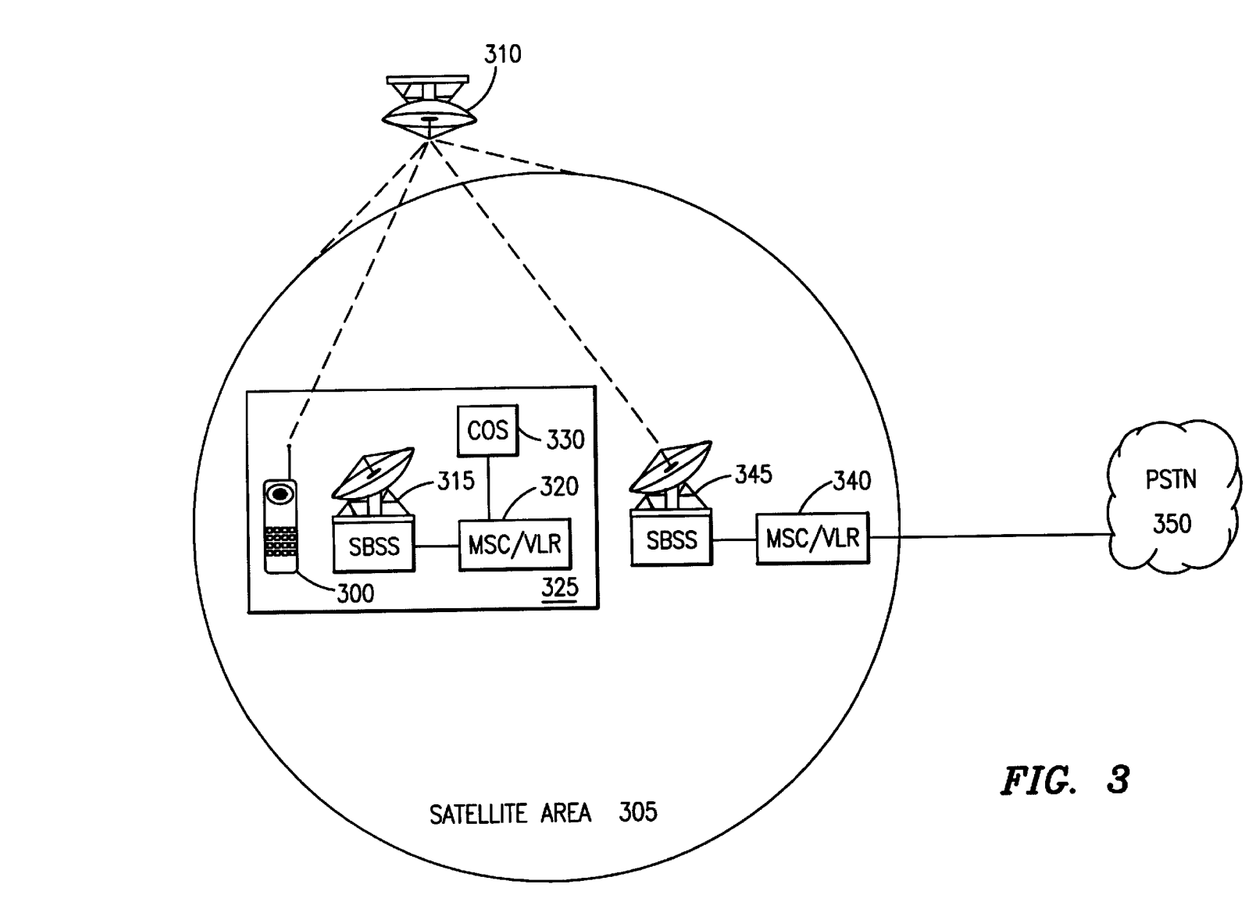
FIG. 3 is a block diagram illustrating call optimization for a mobile originated call to a subscriber within the Public Switched Telephone Network.

With reference now to FIG. 3 of the drawings, optimization of a call from a mobile subscriber to a subscriber within the Public Switched Telephone Network (PSTN) 350 (wireline network) can be accomplished by moving the mobile subscriber's registration to an optimum MSC/VLR 340. When a Mobile Station (MS) 300 within an area 305 visible to a satellite 310 initiates a call to a subscriber within the Public Switched Telephone Network (PSTN) 350, a Mobile Switching Center/Visitor Location Register (MSC/VLR) 320 serving the area 325 that the MS 300 is in analyzes the Called Party Number (CPN) and determines that the CPN is not a number registered within the serving MSC/VLR 320. The serving MSC/VLR then sends the CPN, using, for example, an Unstructured Supplementary Services Data (USSD) string, to a Call Optimization Server (COS) 330 or optimization node, which can be co-located with the serving MSC/VLR 320. Alternatively, it should be noted that the COS 330 could instead be co-located with a Home Location Register (HLR) (shown in FIG. 1) or an external node (not shown), such as a node within the Intelligent Network. The protocol to the external node could be based on an Intelligent Network (IN), Mobile Application Part (MAP) or other protocol.

The COS 330 then performs a pre-analysis on the CPN to determine that the CPN belongs to the PSTN 350. Thereafter, the COS 330 determines the optimum MSC/VLR 340, e.g., the MSC/VLR 340 within the area 305 visible to the satellite 310 that has the closest connection to the PSTN 350 or the least expensive link to the PSTN 350, and returns the address for this optimum MSC/VLR 340 to the MS 300 via the satellite 310 and the serving MSC/VLR 320 and satellite-adapted Base Station System (SBSS) 315. The MS 300 then registers with the indicated MSC/VLR 340, and sends a SETUP message to the new MSC/VLR 340 via the satellite 310 and the new SBSS 345, as is understood in the art. The call can then be completed normally using minimal terrestrial circuits and existing satellite resources.

Figure 4:
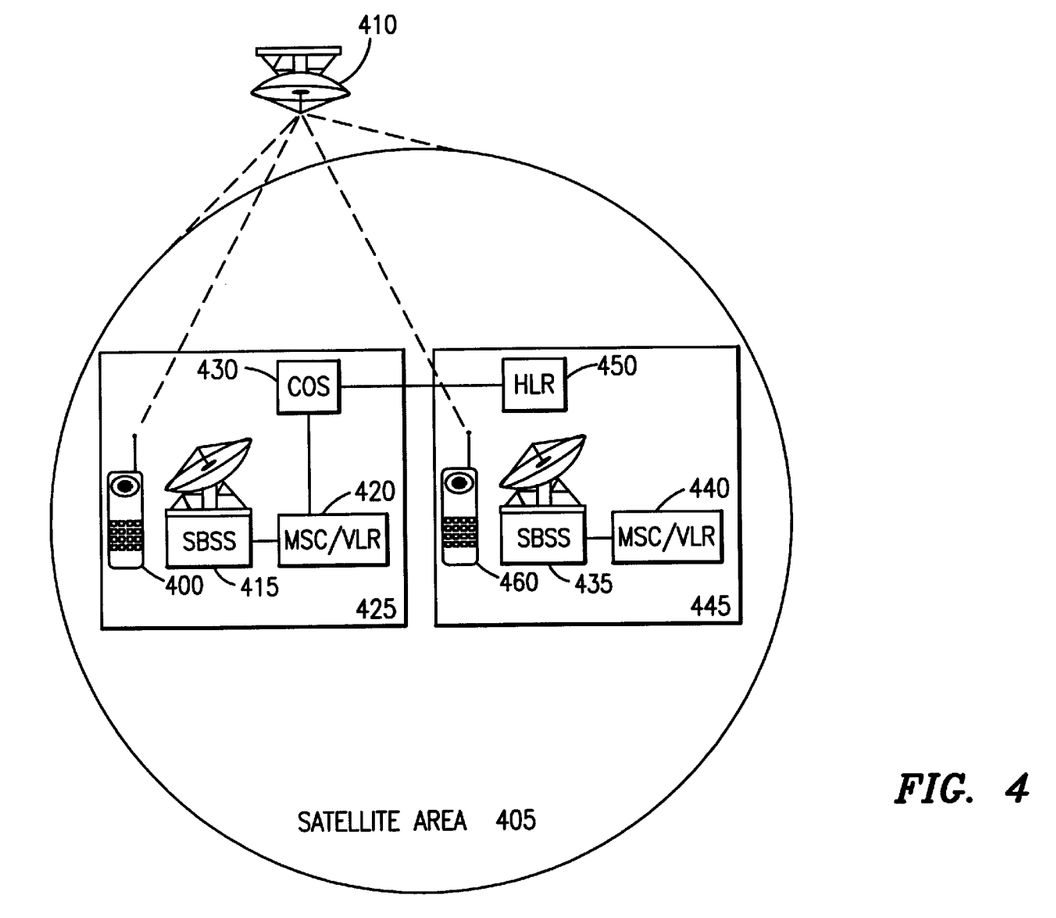
FIG. 4 is a block diagram illustrating call optimization for a mobile to mobile call within the area visible to one geostationary satellite.

With reference now to FIG. 4 of the drawings, if the CPN is associated with another MS 460 within the area 405 visible to the satellite 410, after the SBSS 415 serving the area 425 that the calling MS 400 is in receives the Called Party Number (CPN) and sends it to the serving MSC/VLR 420, which determines that the CPN is not a number registered within the serving MSC/VLR 420, the digit string for the CPN is sent to the COS 430 for pre-analysis. The COS 430 determines that this is a MS 400 to MS 460 call, queries the HLR 450 for the current location of the called (target) MS 460, assigns a transaction identifier to be used for making the connection between the two MSs (400 and 460), and sends a USSD string to the target MS 460 via the MSC/VLR 440 serving the current area 445 that the target MS 460 is in, the serving SBSS 435, and the satellite 410, requesting the target MS 460 to re-register itself on the MSC/VLR 420 where the call originated. The target MS 460 is also given the transaction identifier. In this way, satellite resources can be conserved by performing the connection for these calls within the satellite 410, e.g., only one bi-directional path is required (MS-satellite-MS) instead of two (MS-satellite-SBSS-satellite-MS).

After re-registration in the desired MSC/VLR 420, normal call setup procedures take place, with the addition of an indicator that this is a MS 400 to MS 460 call and the inclusion of the transaction identifier. The MS 400 to MS 460 call indicator is used to disable functions requiring terrestrial switch connections. The transaction identifier is used when channel assignments are done and the connection is made to ensure that the right channels can be connected in the satellite 410. Once the connection is made in the satellite 410, the transaction identifier can be released. If the call from the calling MS 400 is to a called MS 460 within an area visible to a different satellite (not shown) than the calling MS 400 or to no satellite, satellite call optimization does not apply, and conventional methods are used to connect the call, as is well known in the art.

Figure 5:
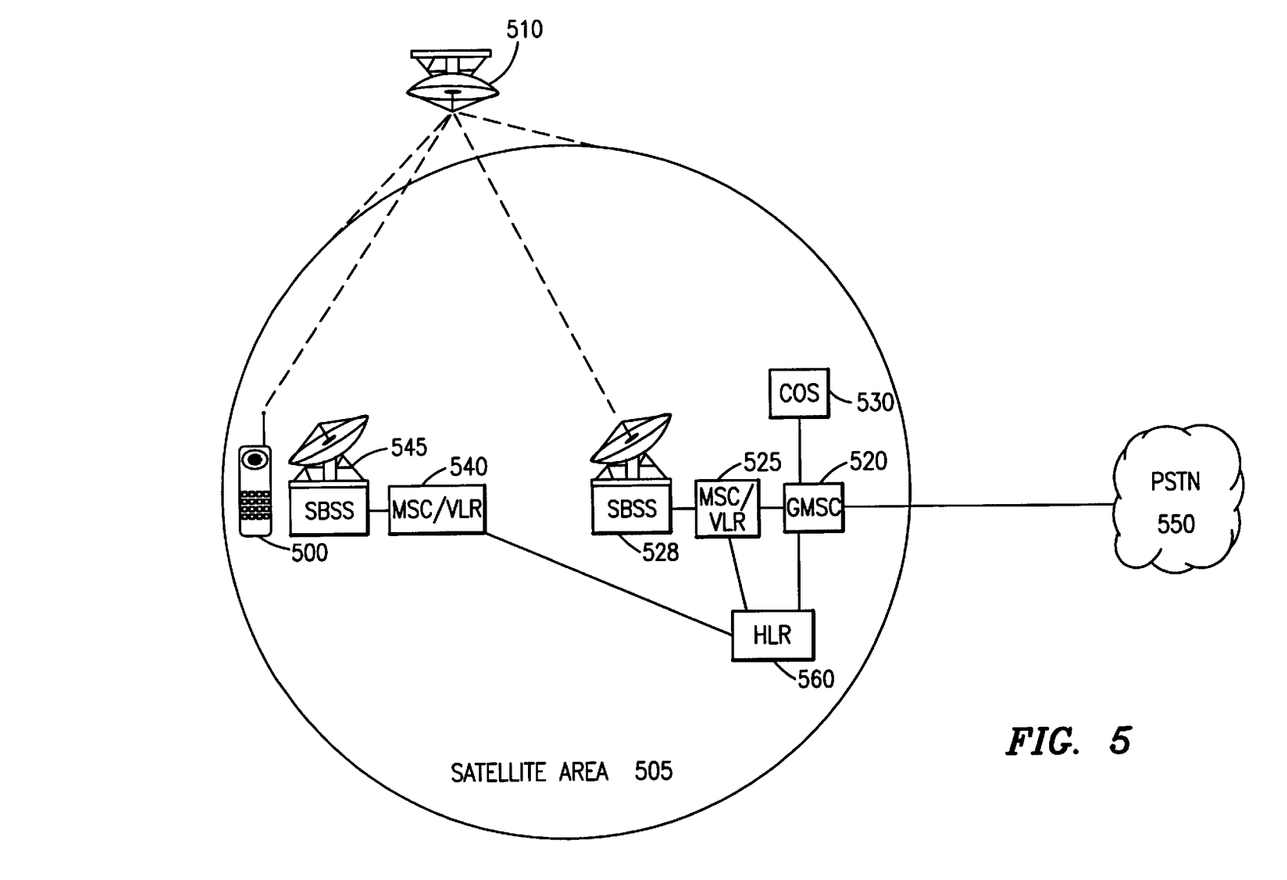
FIG. 5 is a block diagram illustrating call optimization for a mobile terminated call from a subscriber within the Public Switched Telephone Network.

With reference now to FIG. 5 of the drawings, if a subscriber within the PSTN 550 calls a MS 500, the PSTN 550 routes the call to the closest Gateway Mobile Switching Center (GMSC) 520, which serves as the interface between the PSTN 550 and the satellite network 505. The GMSC 520 then queries the HLR 560 to determine which MSC/VLR 540 the MS 500 is currently registered in. The HLR 560 then forwards a request to that MSC/VLR 540 to provide a roaming number, e.g., a Mobile Subscriber Roaming Number (MSRN). The roaming number is returned to the GMSC 520 via the HLR 560 to be analyzed by the GMSC 520. If the roaming number is not a roaming number from the series assigned to the GMSC's 520 own co-located MSC/VLR 525, call optimization must be performed.

Call optimization involves the GMSC 520 sending a request to the Call Optimization Server (COS) 530 to determine the optimum MSC/VLR 525 for the call. The COS 530 then sends a message to the MS 500 via the serving MSC/VLR 540 and SBSS 545 and the satellite 510, ordering the MS 500 to re-register in the MSC/VLR 525 from where the COS 530 received the request. This message can take a number of underlying forms. Two examples for transport mechanisms for the message are Unstructured Supplementary Service Data (USSD), e.g., the message Unstructured_SS_Notify, or Short Message Service (SMS).

Due to the altitude of the satellite(s) 510, the MS 500 can "see" a satellite 510 which can communicate with both the MSC/VLR 540 where it is registered and the MSC/VLR 525 where it "should" be registered from an efficiency perspective. This means that the message can be routed to the MSC/VLR 540 where the subscriber is registered, using existing mechanisms for SMS message delivery. The MS 500 can then use the address of the MSC/VLR 525 where it should re-register and perform the registration process to the new MSC/VLR 525, via the satellite 510 and the new SBSS 528.

The MS 500 then re-registers in the specified MSC/VLR 525 and acknowledges the request to the COS 530. Alternatively, the optimum MSC/VLR 525 can notify the COS 530. The call can then be setup within the optimum MSC/VLR 525 using the original called party number. This will result in a drop-back from the COS 530 to the GMSC 520, which will again query the HLR 560 for routing instructions. Advantageously, if the COS 530 is a separate node, once the call is returned to the GMSC 520, all links between the COS 530 and the GMSC 520 are severed for the duration of the call, resulting in minimal usage of terrestrial links. The HLR 560 will then ask the optimum MSC/VLR 525 for a roaming number and will return this roaming number to the GMSC 520, which will identify it as a local roaming number. Therefore, the COS 530 will not be selected again. The call can then be connected using the optimum MSC/VLR 525 normally, as is well known in the art.

It should be noted that if the GMSC 520 recognizes the called mobile subscriber's directory number as being resident in the local GMSC/MSC/VLR 520/525, no HLR 560 query is needed, and the call can be completed directly to the optimum MSC/VLR 525. In addition, since a call connection is never performed to the original serving MSC/VLR 540, the MSRN provided by that MSC/VLR 540 returns to the pool of MSRN's available to that MSC/VLR 540 after a timer expires within that MSC/VLR 540. Alternatively, the GMSC 520 can send an Any Time Interrogation (ATI) message to the HLR 560 to request the address associated with the original serving MSC/VLR 540 without requiring the original serving MSC/VLR 540 to seize a MSRN. Therefore, no MSRN is left "hanging" in the original serving MSC/VLR 540.

Figure 6:
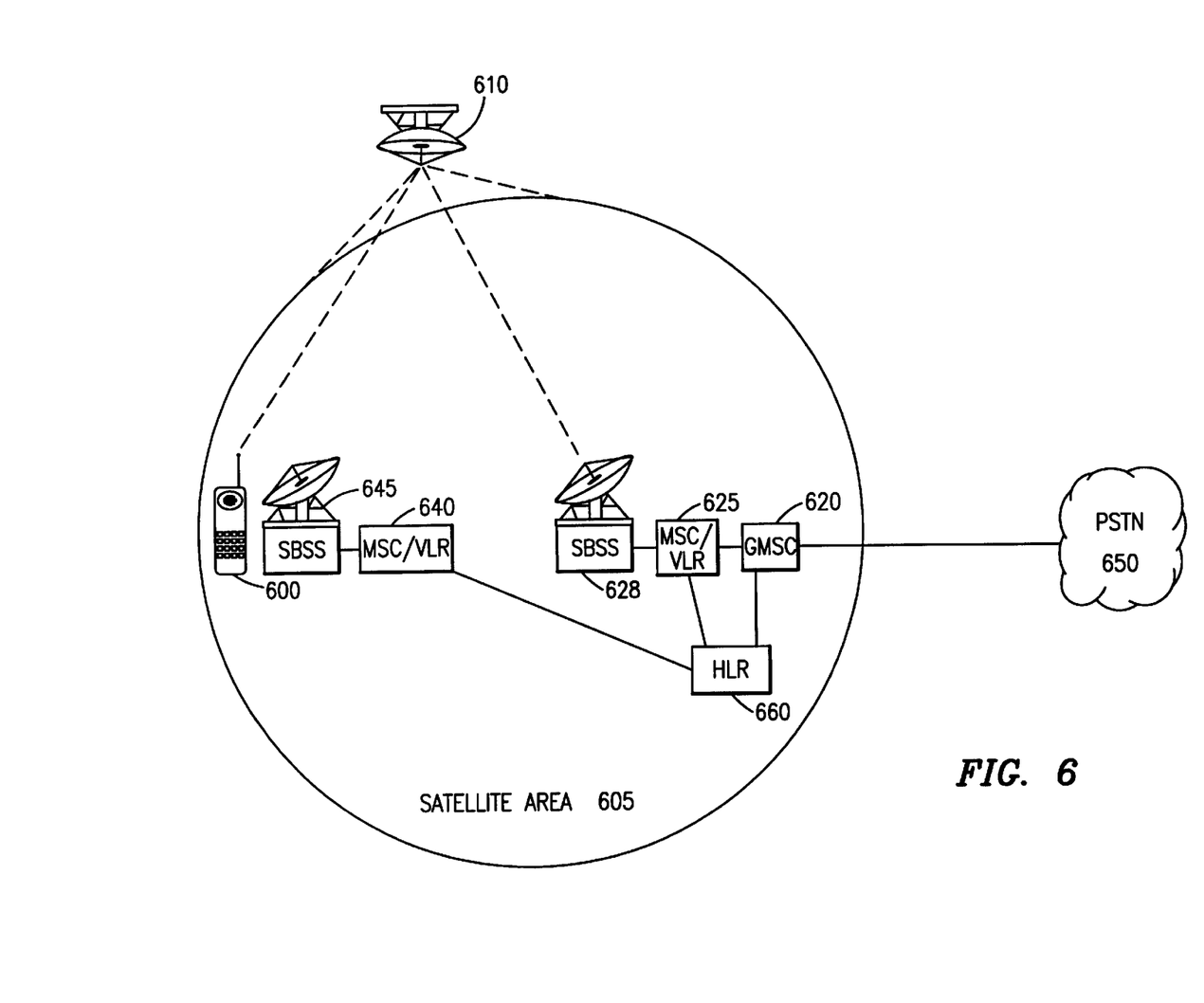
FIG. 6 is a block diagram illustrating an alternative call optimization procedure for a mobile terminated call from a subscriber within the Public Switched Telephone Network.

Alternatively, with reference now to FIG. 6 of the drawings, for PSTN 650 originated calls, the MS 600 can register in the optimum MSC/VLR 625, using protocols between the GMSC 620, MSC/VLRs 625 and 640 and HLR 660, instead of routing the request to the COS 530. For example, when a call comes in to the GMSC 620 from the PSTN 650, the GMSC 620 can query the HLR 660 for routing information. The HLR 660 notes the source of the query, makes appropriate checks, and sends a message to the original MSC/VLR 640 where the MS 600 is registered via the serving SBSS 645 asking whether that MS 600 can be moved. The original serving MSC/VLR 640, which is within the area 605 visible to the satellite 610, makes the appropriate checks, e.g., whether the MS 600 is engaged in a call, and if the MS 600 can be moved, e.g., the MS 600 is not engaged in a call, the HLR 660 initiates a re-registration of the MS 600. This can be accomplished by the HLR 660 sending a USSD message to the MS 600 instructing the MS 600 to re-register with the target MSC/VLR 625 and then asking the new (target) MSC/VLR 625 for a roaming number. The target MSC/VLR 625 then retrieves the subscriber data associated with the MS 600 from the HLR 660 and returns the roaming number to the HLR 660. The HLR 660 then returns this roaming number to the GMSC 620, which will then recognize the roaming number as a local roaming number. The call can then be completed normally via satellite 610, and the new SBSS 628 as is well known in the art.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the query to the Call Optimization Server to determine the optimum Mobile Switching Center/Visitor Location Register can be sent by the serving satellite-adapted Base Station System instead of the serving Mobile Switching Center/Visitor Location Register.

What is claimed is:

1. A telecommunications system for connecting a call using an optimum mobile switching center in wireless communication with a given one of a plurality of mobile terminals via a satellite, said telecommunications system comprising:

an original mobile switching center, said original mobile switching center having reception means for receiving a called number associated with said call; and a call optimization server, connected to said original mobile switching center, for centrally storing information identifying said optimum mobile switching center when said call is either a mobile originated call or a mobile terminated call, said call optimization server receiving said called number from said original mobile switching center, and determining said optimum mobile switching center, using said called number, said call optimization server instructing said given mobile terminal via said satellite to register with said optimum mobile switching center via said satellite, said call being connected to said given mobile terminal using said optimum mobile switching center.

2. The telecommunications system of claim 1, wherein said call is placed from said given mobile terminal to a subscriber within the Public Switched Telephone Network.

3. The telecommunications system of claim 2, wherein said optimum mobile switching center is closer to said subscriber than said original mobile switching center.

4. The telecommunications system of claim 2, wherein said original mobile switching center determines said called number is not registered within said original mobile switching center.

5. The telecommunications system of claim 1, wherein said original mobile switching center sends said called number to said call optimization server using an Unstructured Supplementary Services Data message.

6. The telecommunications system of claim 1, wherein said call optimization server is co-located with said original mobile switching center.

7. The telecommunications system of claim 1, wherein said optimum mobile switching center is within a coverage area covered by said satellite.

8. The telecommunications system of claim 1, wherein said call optimization server instructs said given mobile terminal to register with said optimum mobile switching center by sending a message to said given mobile terminal via said original mobile switching center and said satellite.

9. The telecommunications system of claim 8, further comprising a satellite-adapted base station system connected to said original mobile switching center, said message being sent to said given mobile terminal via said satellite-adapted base station system.

10. The telecommunications system of claim 8, wherein said message is sent using an Unstructured Supplementary Service Data message.

11. The telecommunications system of claim 8, wherein said message is sent using a Short Message Service message.

12. The telecommunications system of claim 1, wherein said given mobile terminal sends a SETUP message via said satellite to said optimum mobile switching center prior to connecting said call using said optimum mobile switching center.

13. The telecommunications system of claim 1, wherein said optimum mobile switching center has an address associated therewith, said call optimization server sending said address to said given mobile terminal via said satellite, said given mobile terminal registering with said optimum mobile switching center using said address.

14. The telecommunications system of claim 1, wherein said call is placed from an additional mobile terminal in wireless communication with said original mobile switching center to said given mobile terminal, said optimum mobile switching center being said original mobile switching center.

15. The telecommunications system of claim 14, wherein said given mobile terminal is in wireless communication with an additional mobile switching center, said call optimization server sending a message to said given mobile terminal, via said additional mobile switching center and said satellite, instructing said given mobile terminal to register with said optimum mobile switching node.

16. The telecommunications system of claim 15, further comprising a home location register connected to said call optimization server, said call optimization server determining said additional mobile switching center using said home location register.

17. The telecommunications system of claim 16, wherein said call optimization server assigns a transaction identifier to said call, said transaction identifier being sent to said given mobile terminal, said transaction identifier being used by said satellite to connect said call between said given mobile terminal and said additional mobile terminal.

18. The telecommunications system of claim 1, wherein said call is placed from a subscriber within the Public Switched Telephone Network.

19. The telecommunications system of claim 18, wherein said original mobile switching center is a gateway mobile switching center.

20. The telecommunications system of claim 19, wherein said given mobile terminal is in wireless communication with an additional mobile switching center, said call optimization server sending a message to said given mobile terminal, via said additional mobile switching center and said satellite, instructing said given mobile terminal to register with said optimum mobile switching center, said optimum mobile switching center being co-located with said gateway mobile switching center.

21. The telecommunications system of claim 20, further comprising a home location register connected to said gateway mobile switching center, said gateway mobile switching center determining said additional mobile switching center using said home location register, said additional mobile switching center sending a roaming number to said gateway mobile switching center via said home location register, said roaming number being analyzed by said gateway mobile switching center to determine said additional mobile switching center is not said optimum mobile switching center, said gateway mobile switching center sending a request to said call optimization server to instruct said given mobile terminal to register with said optimum mobile switching center.

22. A method for connecting a call using an optimum mobile switching center in wireless communication with a given one of a plurality of mobile terminals via a satellite, said method comprising the steps of:

centrally storing, within a call optimization server, information identifying said optimum mobile switching center when said call is either a mobile originated call or a mobile terminated call;

receiving, by an original mobile switching center, a called number associated with said call;

sending, by said original mobile switching center, said called number to said call optimization server connected to said original mobile switching center;

analyzing, by said call optimization server, said called number to determine said optimum mobile switching center;

instructing, by said call optimization server, said given mobile terminal to register with said optimum mobile switching center via said satellite; and connecting said call to said given mobile terminal using said optimum mobile switching center.

23. The method of claim 22, wherein said call is placed from said given mobile terminal to a subscriber within the Public Switched Telephone Network.

24. The method of claim 23, wherein said optimum mobile switching center is closer to said subscriber than said original mobile switching center.

25. The method of claim 23, further comprising, before said step of sending said called number, the step of:

determining, by said original mobile switching center, said called number is not registered within said original mobile switching center.

26. The method of claim 22, wherein said step of sending said called number to said call optimization server is performed using an Unstructured Supplementary Services Data message.

27. The method of claim 22, wherein said call optimization server is co-located with said original mobile switching center.

28. The method of claim 22, wherein said optimum mobile switching center is within a coverage area covered by said satellite.

29. The method of claim 22, wherein said step of instructing said given mobile terminal to register with said optimum mobile switching center is performed by said call optimization server sending a message to said given mobile terminal via said original mobile switching center and said satellite.

30. The method of claim 29, wherein said step of instructing said given mobile terminal is performed by sending said message to said given mobile terminal via a satellite-adapted base station system connected to said original mobile switching center.

31. The method of claim 29, wherein said message is sent using an Unstructured Supplementary Service Data message.

32. The method of claim 29, wherein said message is sent using a Short Message Service message.

33. The method of claim 22, further comprising, before said step of connecting said call, the step of:

sending, by said given mobile terminal, a SETUP message via said satellite to said optimum mobile switching center prior to connecting said call using said optimum mobile switching center.

34. The method of claim 22, wherein said optimum mobile switching center has an address associated therewith, and further comprising, before said step of connecting said call, the steps of:

sending, by said call optimization server, said address to said given mobile terminal via said satellite; and registering, by said given mobile terminal, with said optimum mobile switching center using said address.

35. The method of claim 22, wherein said call is placed from an additional mobile terminal in wireless communication with said original mobile switching center to said given mobile terminal, said optimum mobile switching center being said original mobile switching center.

36. The method of claim 35, wherein said given mobile terminal is in wireless communication with an additional mobile switching center, said step of instructing being performed by said call optimization server sending a message to said given mobile terminal, via said additional mobile switching center and said satellite, instructing said given mobile terminal to register with said optimum mobile switching center.

37. The method of claim 36, further comprising, before said step of instructing, the step of:

determining, by said call optimization server, said additional mobile switching center using a home location register connected to said call optimization server.

38. The method of claim 37, further comprising, before said step of instructing, the steps of:

assigning, by said call optimization server, a transaction identifier to said call; and sending, by said call optimization server, said transaction identifier being sent to said given mobile terminal, said transaction identifier being used by said satellite during said step of connecting said call between said given mobile terminal and said additional mobile terminal.

39. The method of claim 22, wherein said call is placed from a subscriber within the Public Switched Telephone Network to said given mobile terminal.

40. The method of claim 39, wherein said original mobile switching center is a gateway mobile switching center.

41. The method of claim 40, wherein said given mobile terminal is in wireless communication with an additional mobile switching center, said step of instructing being performed by said call optimization server sending a message to said given mobile terminal, via said additional mobile switching center and said satellite, instructing said given mobile terminal to register with said optimum mobile switching center, said optimum mobile switching center being co-located with said gateway mobile switching center.

42. The method of claim 41, further comprising, before said step of sending said called number, the steps of:

determining, by said gateway mobile switching center, said additional mobile switching center using a home location register connected to said gateway mobile switching center;

sending, by said additional mobile switching center, a roaming number to said gateway mobile switching center via said home location register;

analyzing said roaming number by said gateway mobile switching center to determine said additional mobile switching center is not said optimum mobile switching center; and sending, by said gateway mobile switching center, a request to said call optimization server to instruct said given mobile terminal to register with said optimum mobile switching center.

* * * * *